Figure 5:
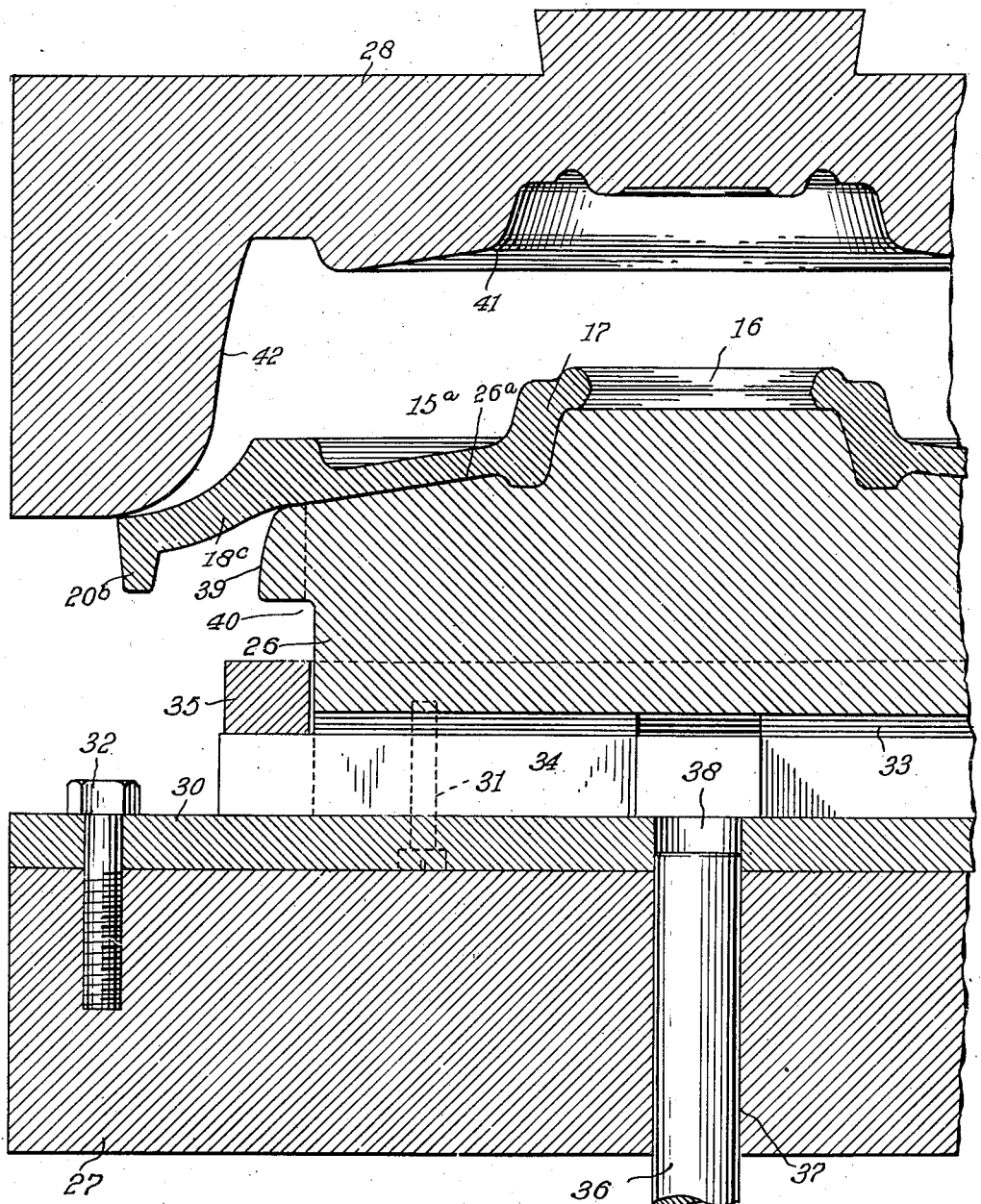

May 14, 1946. C. A. BRAUCHLER 2,400,387
METHOD AND APPARATUS FOR FORGING CRANKCASES
Filed July 1, 1943 6 Sheets-Sheet 1
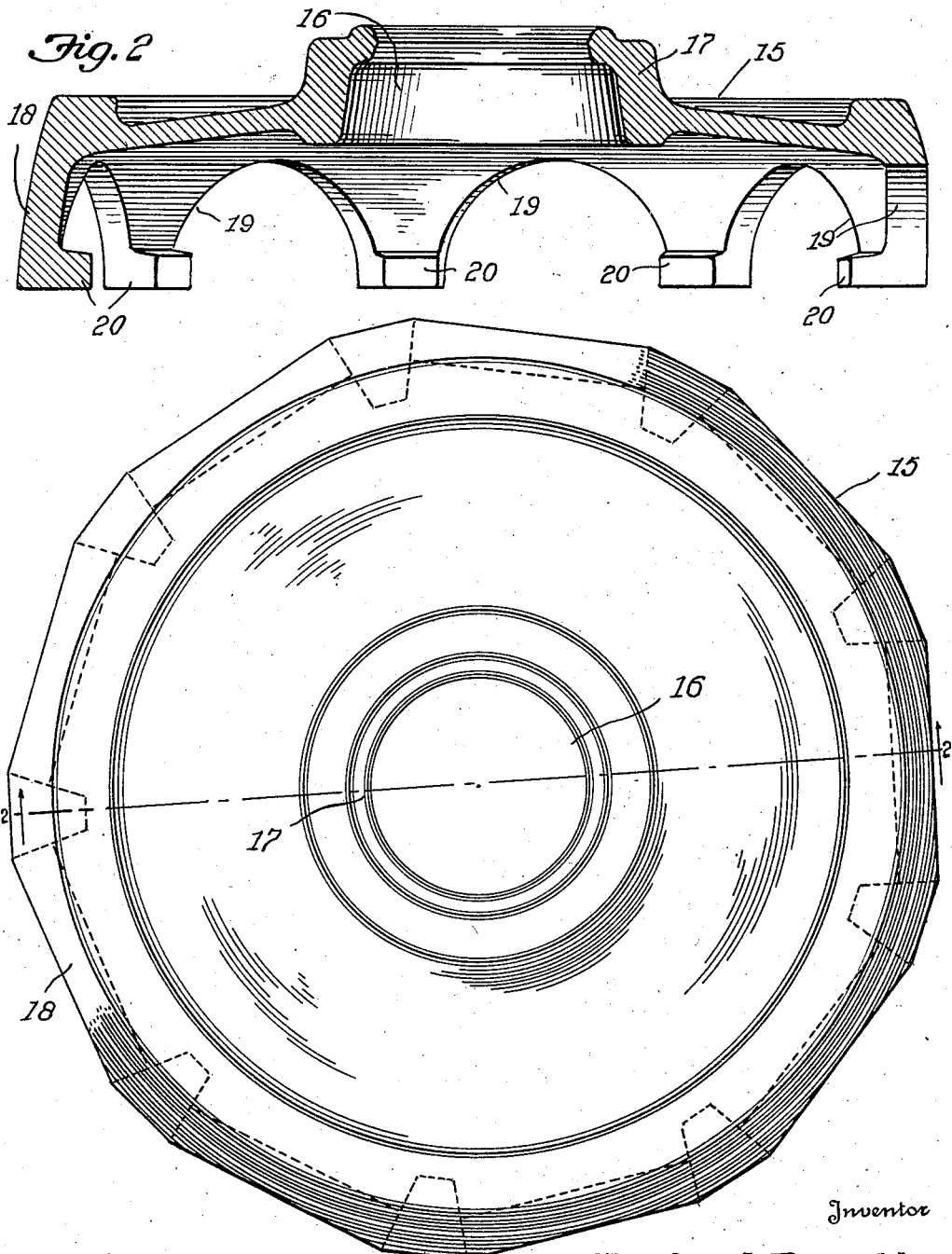

May 14, 1946.   C. A. BRAUCHLER   2,400,387
METHOD AND APPARATUS FOR FORGING CRANKCASES
Filed July 1, 1943   6 Sheets-Sheet 2
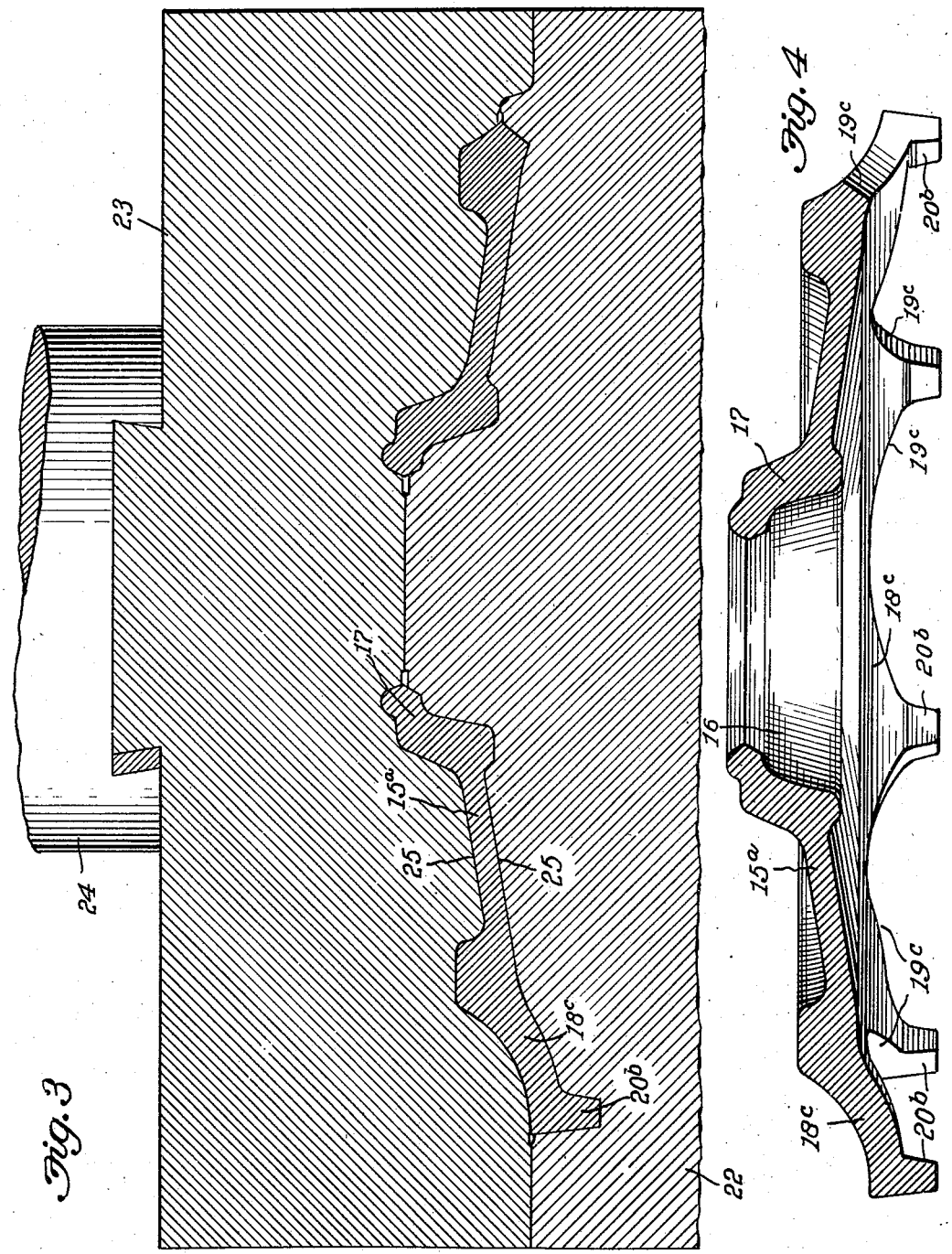
Inventor
Charles A. Brauchler
By Frease and Bishop
Attorneys

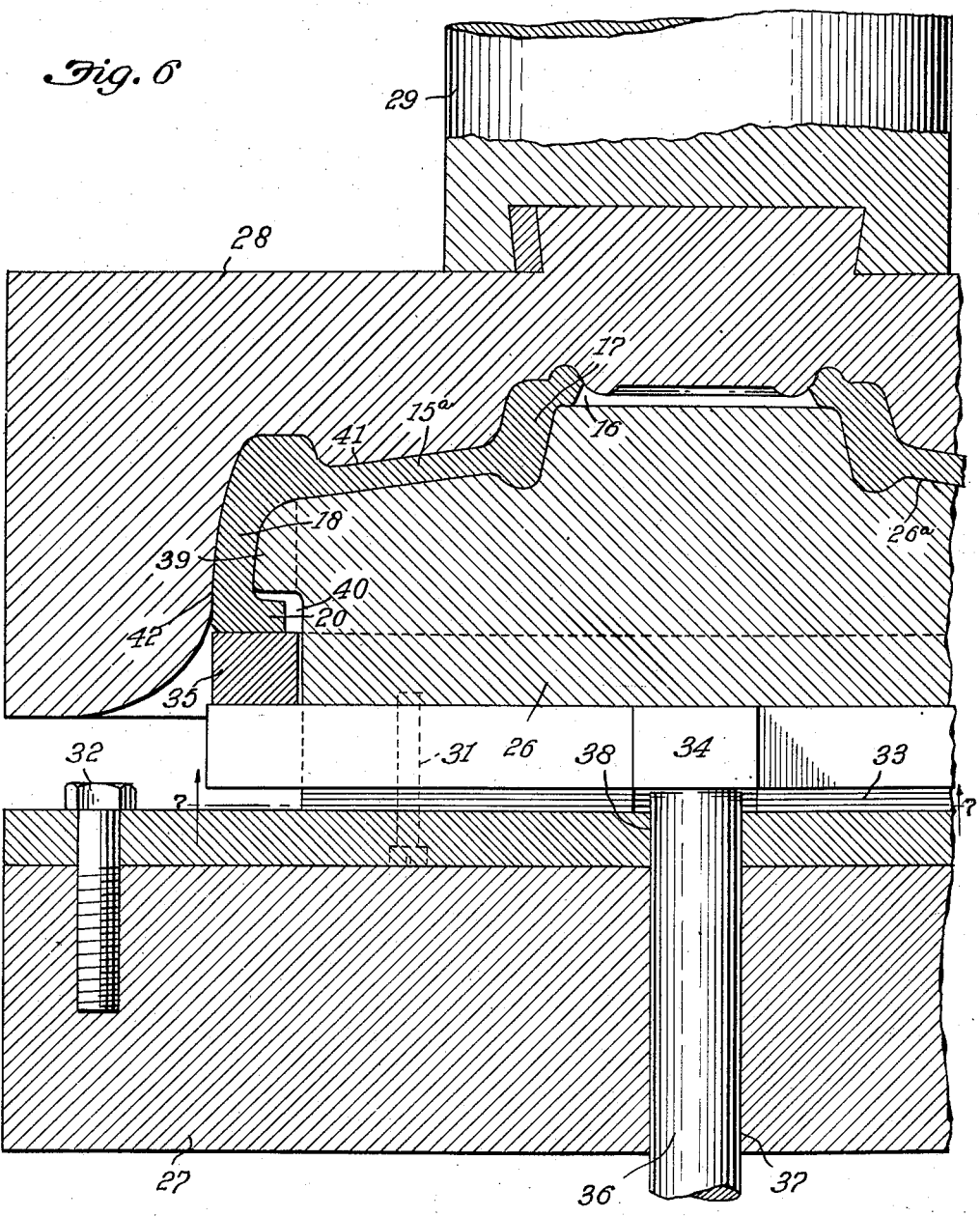

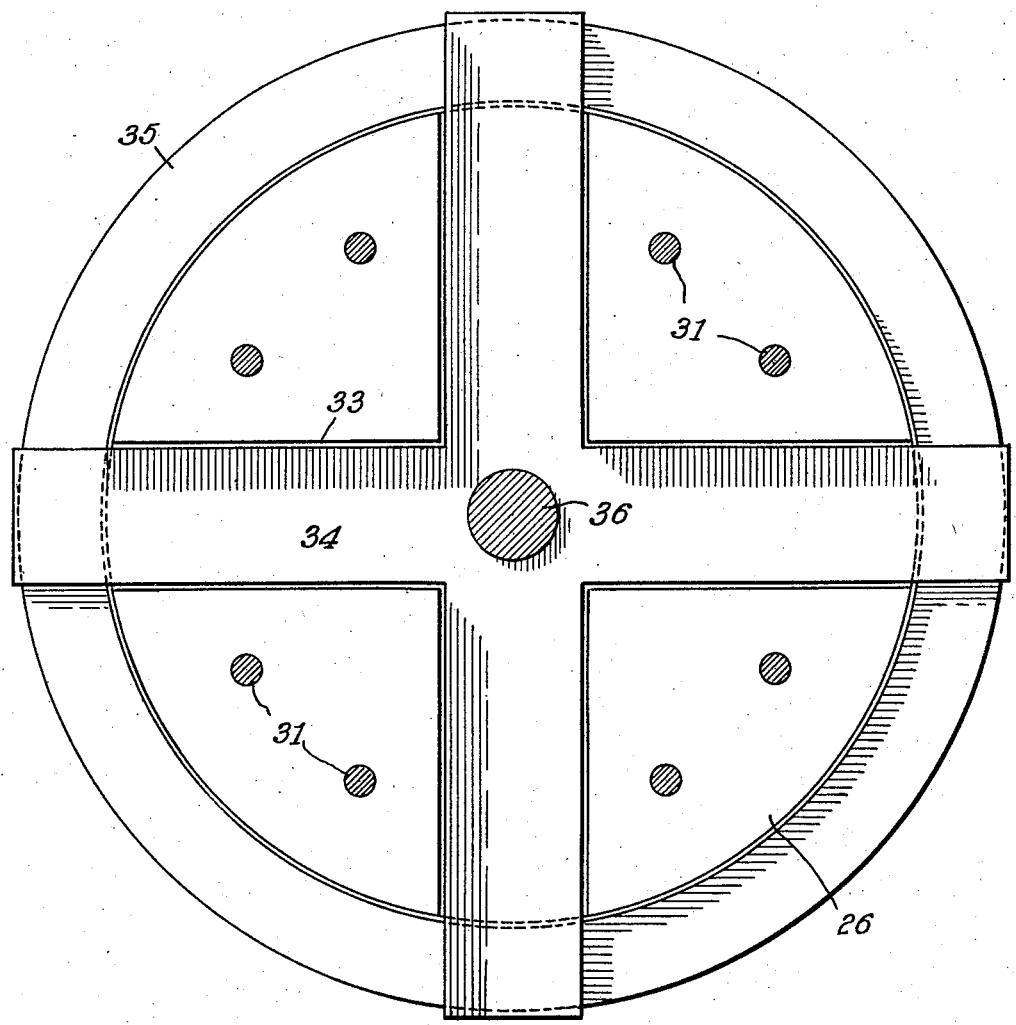

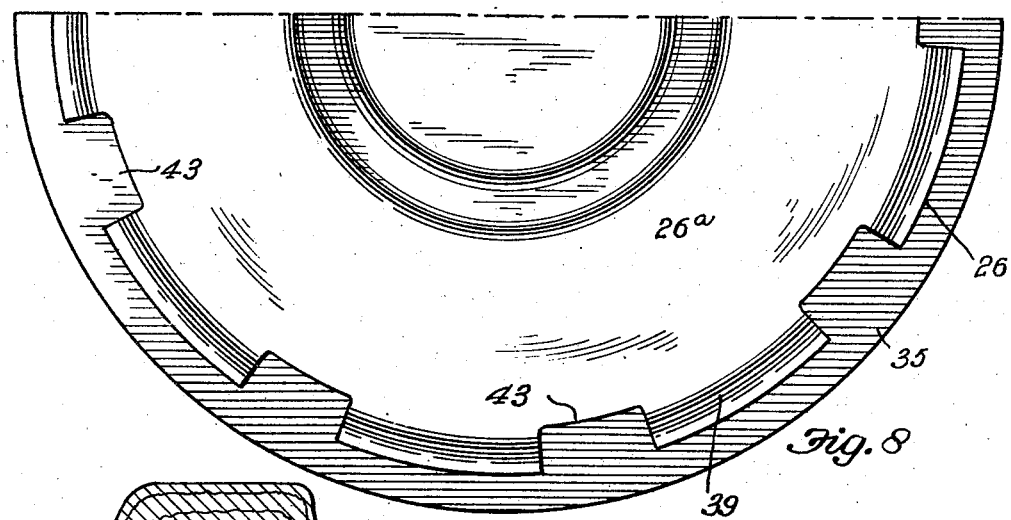

Patented May 14, 1946

2,400,387

UNITED STATES PATENT OFFICE 2,400,387

METHOD AND APPARATUS FOR FORGING CRANKCASES

Charles A. Brauchler, Canton, Ohio

Application July 1, 1943, Serial No. 493,025

9 Claims. (Cl. 29—156.4)

The invention relates to the production of forgings for the crankcases of radial motors such as are used in aircraft, and more particularly to means whereby better forgings may be produced with less labor, time and expense than under present practice.

Crankcases of this character are formed of mating sections, each of which is of generally circular shape having a central opening, shaped to receive a bearing for the crankshaft, and provided with an annular, peripheral flange having spaced, half-round cutouts with inturned lugs at the edge of the flange between said cutouts. Two sections of this general type are opposed and attached together by bolts or the like located through the abutting inturned lugs, the corresponding half-round cutout portions of the two sections forming circular openings which receive the radially disposed cylinders of the motor.

Under present practice these sections are forged with the peripheral flange of a thickness equal to the length of the inturned lugs at the edge of the flange after which it is necessary for the flange to be machined down to a specified thickness before the forgings are delivered by the drop forging plant to the airplane engine manufacturer.

This machining work at the drop forging plane not only requires many hours of labor but a considerable amount of excess metal in the forging is cut away and this machining cuts through the grain flow of the metal, leaving a cross grain in the inturned lugs at the edges of the flange, thus obviously weakening the structure at these points.

It is an object of the present invention to overcome these objects by providing a method and means for producing such crankcase forgings without the use of any excess metal, thus obviating the necessity of machine work at the drop forging plant, and at the same time producing a stronger and better structure in which the grain flow in the metal is arranged longitudinally through the inturned lugs at the edges of the peripheral flange.

Another object is the provision of means whereby the crankcase section is forged in substantially flat condition and then while hot placed in bending dies which bend the peripheral flange down to the desired position.

A further object is the provision of means associated with the bending dies for straightening and lining-up all of the inturned lugs at the edge of the peripheral flange.

A still further object is the provision of means for easily and readily disengaging the formed crankcase forging from the bending dies.

Still another object is the provision of means comprising a slidable ring surrounding one of the bending dies and a plunger operated spider for moving the ring longitudinally upon the die to straighten and line-up the inturned lugs upon the peripheral flange of the forging.

The above and other objects are attained by forging the crankcase section to the specified forging dimensions with the peripheral flange extending outward around the periphery of the forging in substantially flat condition, and the lugs at the edge of the flange extending downward, and then bending the peripheral flange downward to the required position with the lugs at the edge thereof turned inward so that the finished forging is produced without requiring any machine work at the drop forging plant and with the grain flow of the metal extending longitudinally through the inturned lugs.

An embodiment of the invention is illustrated in the accompanying drawings in which—

Figure 1 is a top plan view of one form of radial motor crankcase section;

Fig. 2, a transverse section through the same taken on the line 2—2, Fig. 1;

Fig. 3, a vertical sectional view of the forging dies for producing the initial, substantially flat forging, showing the dies in closed position with the initial crankcase section forging therein;

Fig. 4, a transverse sectional view through the initial forging produced by the dies shown in Fig. 3;

Fig. 5, a vertical sectional view through the bending dies, showing the dies in open position with the initial forging positioned therein before bending;

Fig. 6, a view similar to Fig. 5 showing the bending dies in closed position with the finished crankcase section forging therein;

Fig. 7, a bottom plan sectional view of the lower bending dies and the slidable ring and spider for flattening and lining-up the inturned lugs taken on the line 7—7, Fig. 6;

Fig. 8, a top plan view of one-half of the lower bending die;

Fig. 9, a fragmentary full size sectional view through the peripheral flange portion of the crankcase section as forged under present practice;

Fig. 10, a similar view after the peripheral flange has been machined to the specified size and shape; and Fig. 11, a similar view of the peripheral flange portion of a crankcase section as produced under the present invention.

Similar numerals refer to similar parts throughout the drawings.

Crankcase sections for radial motors vary in design for different types of motors, but there are certain characteristics which are common to all of these crankcase sections, namely a peripheral flange located substantially at a right angle to the normal plane of the crankcase section, and having half-round cutouts therein, inturned lugs being located at the edge of the flange between said cutouts.

One form of crankcase section of this general type is illustrated and described herein as illustrative of the manner in which the invention may be practiced to produce any of the various designs of crankcase sections for radial motors, and it should be understood that the invention applies to all designs of such crankcase sections having the common characteristics above referred to.

The airplane motor manufacturer furnishes the drop forging plant with the specifications and dimensions of the crankcase forging to be produced by the forging plant, and as above mentioned under present practice it is necessary for the forging plant to do considerable machine work upon the forging in order to meet the specifications of the motor manufacturer.

In Figs. 1 and 2 is illustrated a typical design of a crankcase forging of the general type referred to showing the same in the condition specified by the airplane motor manufacturer.

This crankcase section is indicated generally at 15 having the central opening 16 surrounded by a bearing receiving portion 17 and provided with the down turned peripheral flange 18, having half-round cutouts 19 therein, the flange 18 terminating in inturned lugs 20 between said cutouts.

Under present practice it is not possible to forge the flange 18 to the desired dimensions with the inturned lug 20 at its end but this flange is forged of a thickness equal to the length of the lug as indicated at 18ᵃ in Figure 9.

The inner side of this flange is then machined out as indicated at 21 in Figure 10, leaving the flange 18ᵇ of the required thickness and the inturned lug 20ᵃ at the edge of the flange. This machine work requires considerable labor and expense and a great deal of excess metal which has been forged into the flange is cut away. This costly operation is necessary however under present practice since there is no other known way to forge such parts to the required size and shape.

The present invention overcomes the above objections and eliminates the time, labor and expense required for machining the peripheral flange as shown in Fig. 10 and also produces the forging of specified size and shape without any excess metal therein.

Briefly the invention consists in initially forging the crankcase section in substantially flat condition with the peripheral flange extended out substantially in the normal plane of the body portion of the forging, said flange being forged to the required thickness with the lugs formed at the edge of the flange.

Then in a bending operation the flange is bent to the desired position and the crankcase section forging is ready for delivery to the airplane engine manufacturer.

In carrying out the invention the crankcase section is initially forged from a block or blank of steel or the like, in dies as shown in Fig. 3 in which the lower forging die 22 may be fixed upon the bottom of a drop hammer and the upper die 23 may be carried by the ram or head 24 of the hammer.

These forging dies have the complemental recesses 25 shaped to produce the initial forged product 15ᵃ having the central opening 16 surrounded by the bearing receiving portion 17, as in the finished forging, the peripheral flange 18ᶜ with cutout portions 19ᶜ being extended outward substantially in the plane of the body portion of the forging, the flange being of the thickness desired in the finished forging and being provided at its edge with the down turned lugs 20ᵇ.

The initial forging thus produced is shown in Fig. 4 as it appears when removed from the forging die. This initial forging is then placed in bending dies shown in Figures 5 to 8 inclusive where the final operation is performed.

These bending dies comprise the lower fixed die 26, which is fixed to the bed 27 of a press, and the upper movable die 28 which is carried by the ram or head 29 of the press.

The lower die 26 may be attached to the bed 27 by means of a plate 30 connected to the bottom of the die as by screws 31 and connected to the bed 27 as by the screws or bolts 32.

The underside of the lower die 26 is provided with a cross shape groove 33 within which is mounted, for vertical movement, a cross shape spider 34 which normally rests upon the bed plate 30 as shown in Figure 5. As this spider is of a thickness somewhat less than the depth of the groove 33, as shown quite clearly in Figures 5 and 6, the spider is permitted to have a limited vertical movement between the top of the groove 33 and the base plate 30.

A ring 35 is slidably mounted around the lower, cylindric portion of the lower die 26 and rests upon the outer end portion of the lugs of the spider 34 which protrude considerably beyond the periphery of the die 26 as shown in Figs. 5, 6 and 7.

A plunger 36, which may be operated by the ram or piston of a hydraulic cylinder, or other suitable means, is slidably mounted through a central opening 37 in the bed of the press and a registering opening 38 in the bed plate 30, and arranged to contact the central portion of the spider 34 to raise the same within the groove 33.

The lower die 26 is shaped upon its top as at 26ᵃ to receive the underside of the initial forging 15ᵃ and its peripheral portion 39 is shaped to conform to the inner contour of the flange 18 of the finished forging as shown in Figs. 1 and 2, the periphery of the die being reduced below said portion 39, forming a peripheral recess as at 40 to receive the inturned lugs 20.

The upper movable die 28 is shaped on its underside to conform to the upper contour of the body portion of the initial forging as shown at 41 and is provided around its periphery with the depending skirt 42 shaped to conform to the outer contour of the flange 18.

The heated initial forging 15ᵃ is placed upon the lower die 26 as shown in Fig. 5 and the upper die 28 is then lowered by the ram or head 29 of the press, as shown in Fig. 6, bending the flange 18 down as shown in said figure, the inturned lugs 20 thereon being received in the recess 40 of the lower die.

In order to properly straighten and line-up all of the lugs 20 in the same plane, the plunger 36 is then operated raising the spider 34 and ring 35, as shown in Fig. 6, the upper surface of the ring engaging the undersurfaces of the lugs 20 flattening the same and lining them all up properly in the same plane.

When the upper die 28 is raised the finished forging may be tapped lightly with a bar or the like to move it radially a sufficient distance to move the lugs 20 from beneath the shouldered portions 39 of the die 26 and into position to register with the peripheral notches 43 permitting the forging to be raised from the lower die. The finished forging thus produced is shown in Figs. 1 and 2 and is ready for delivery to the engine manufacturer without requiring any machine work at the drop forging plant.

Thus with the combined forging and bending operations the finished forging is produced not only eliminating the time, labor and expense of machine work at the forge shop in cutting away excess metal but a stronger and better forging is produced as the arrangement of the grain flow through the flange 18 and inturned lugs 20 is superior to that obtained by present practice.

Referring to Figs. 9, 10 and 11 it will be seen that in Fig. 9 the grain flow extends longitudinally through the forged thick flange 18ª, from top to bottom thereof, and when the excess metal is cut from the inside of said flange, as indicated at 21 in Fig. 10, this cuts through the grain of the metal leaving a cross grain through the inturned lug 20ª, thus weakening the structure at these lugs by means of which the crankcase sections are connected together.

As shown in Fig. 11 by forging the flange 18 and lug 20 to final dimensions in the initial forging operation the grain flow of the metal will extend down through the flange 18 and outward through the inturned lugs 20 thus producing a stronger and better structure.

I claim:

1. The method of forming a forging for a crankcase section for a radial motor, said forging having a substantially flat, circular body portion provided with a central opening surrounded by a bearing portion and a peripheral flange upon the body portion having spaced cutout portions and inturned lugs at the edge of the peripheral flange between said cutout portions, said method consisting in forging the article to the desired dimensions with the peripheral flange extending outward substantially in the plane of the body portion and the lugs extending downward from the edge of the peripheral flange, then placing the forging while at forging temperature in bending dies and pressing the dies together bending said peripheral flange downward from the periphery of the body portion and over the peripheral portion of one die with the lugs extending inwardly from the edge of the flange and into a recess below said peripheral portion of said one die and then pressing the undersurfaces of the heated lugs to flatten them and line them up uniformly in the same plane.

2. The method of forming a forging for a crankcase section for a radial motor, said forging having a substantially flat, circular body portion provided with a central opening surrounded by a bearing portion and a peripheral flange upon the body portion having spaced cutout portions and inturned lugs at the edge of the peripheral flange between said cutout portions, said method consisting in forging the article to the desired dimensions with the flange extending outward substantially in the plane of the body portion and the lugs extending downward from the edge of the peripheral flange, then placing the forging while at forging temperature in bending dies and pressing the dies together bending said peripheral flange downward from the periphery of the body portion and over the peripheral portion of one die with the lugs extending inwardly from the edge of the peripheral flange and into a recess below said peripheral portion of said one die then pressing the under surfaces of the heated lugs to flatten them and then rotating the forging upon said one die until said lugs register with notches in the peripheral portion of said one die.

3. The method of forming a forging for a crankcase section for a radial motor, said forging having a substantially flat, circular body portion provided with a central opening surrounded by a bearing portion and a peripheral flange upon the body portion having spaced cutout portions and inturned lugs at the edge of the peripheral flange between said cutout portions, said method consisting in forging the article to the desired dimensions with the peripheral flange extending outward substantially in the plane of the body portion and the lugs extending downward from the edge of the peripheral flange, then placing the forging while at forging temperature in bending dies and pressing the dies together bending said peripheral flange downward from the periphery of the body portion and over the peripheral portion of one die with the lugs extending inwardly from the edge of the peripheral flange and into a recess below said peripheral portion of said one die, then pressing the undersurfaces of the lugs while heated to flatten them and line them up uniformly in the same plane and then rotating the forging upon said one die until said lugs register with notches in the peripheral portion of said one die.

4. Bending and forming dies for bending a substantially flat crankcase section forging to finished shape, said dies comprising a fixed die having its upper side shaped to conform to the under side of the body portion of the forging and having its peripheral portion shaped to conform to the desired finished inside contour of the peripheral portion of the forging said die being peripherally recessed beneath said peripheral portion to receive spaced angular lugs at the periphery of the forging and a cup shaped movable die for bending the peripheral portion of the forging down around the peripheral portion of the fixed die and positioning the lugs in said recessed portion of the fixed die and movable means upon the fixed die for contacting the under surfaces of the lugs.

5. Bending and forming dies for bending a substantially flat crankcase section forging to finished shape, said dies comprising a fixed die having its upper side shaped to conform to the under side of the body portion of the forging and having its peripheral portion shaped to conform to the desired finished inside contour of the peripheral portion of the forging said die being recessed beneath said peripheral portion to receive spaced angular lugs at the periphery of the forging, means for bending the peripheral portion of the forging down around the peripheral portion of the fixed die and positioning the lugs in said recessed portion of the fixed die, a ring slidably mounted upon the recessed portion of the fixed die and means for moving the ring against the under surfaces of the lugs.

6. Bending and forming dies for bending a substantially flat crankcase section forging to finished shape, said dies comprising a fixed die having its upper side shaped to conform to the under side of the body portion of the forging and having peripheral portions at spaced locations shaped to conform to the desired finished inside contour of the peripheral portion of the forging, said die being recessed beneath said peripheral portion to receive spaced angular lugs at the periphery of the forging, the peripheral portion of the fixed die having a plurality of spaced notches therein of greater width than the lugs said notches being located between said shaped portions.

7. Bending and forming dies for bending a substantially flat crankcase section forging to finished shape, said dies comprising a fixed die having its upper side shaped to conform to the under side of the body portion of the forging and having peripheral portions at spaced locations shaped to conform to the desired finished inside contour of the peripheral portion of the forging, said die being recessed beneath said peripheral portion to receive spaced angular lugs at the periphery of the forging, the peripheral portion of the fixed die having a plurality of spaced notches therein of greater width than the lugs said notches being located between said shaped portions, a ring slidably mounted upon the recessed portion of the fixed die and means for moving the ring against the under surfaces of the lugs.

8. Bending and forming dies for bending a substantially flat crankcase section forging to finished shape, said dies comprising a fixed die having its upper side shaped to conform to the under side of the body portion of the forging and having its peripheral portion shaped to conform to the desired finished inside contour of the peripheral portion of the forging, said die being reduced to form an annular recess beneath said peripheral portion to receive spaced angular lugs at the periphery of the forging, means for bending the peripheral portion of the forging down around the peripheral portion of the fixed die and positioning the lugs in said recessed portion of the fixed die, the lower end of the fixed die having a groove therein, a spider vertically movable in said groove, a plunger for moving the spider in the groove and a ring resting upon the spider and surrounding the reduced portion of the fixed die for contact with the undersurfaces of the lugs.

9. Bending and forming dies for bending a substantially flat crankcase section forging to finished shape, said dies comprising a fixed die having its upper side shaped to conform to the under side of the body portion of the forging and having peripheral portions at spaced locations shaped to conform to the desired finished inside contour of the peripheral portion of the forging, said die being reduced beneath said peripheral portion to receive spaced angular lugs at the periphery of the forging, the peripheral portion of the fixed die having a plurality of spaced notches therein of greater width than the lugs said notches being located between said shaped portions, the lower end of the fixed die having a groove therein, a spider vertically movable in said groove, a plunger for moving the spider in the groove and a ring resting upon the spider and surrounding the reduced portion of the fixed die for contact with the undersurfaces of the lugs.

CHARLES A. BRAUCHLER.